July 29, 1924.
T. A. DAVIS
CUFF FASTENER
Filed Oct. 24, 1923
1,503,230
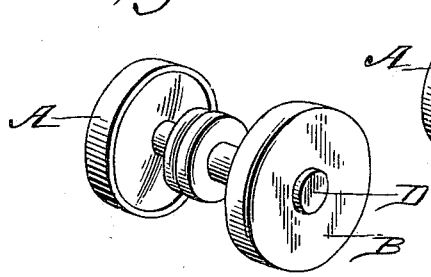
Fig. 1.
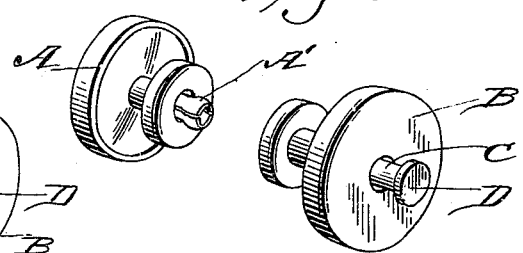
Fig. 2.
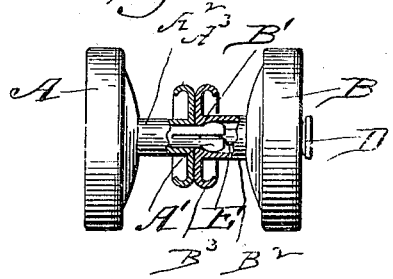
Fig. 3.
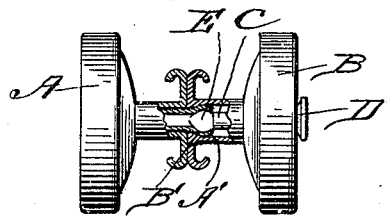
Fig. 4.
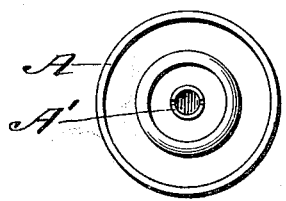
Fig. 5.
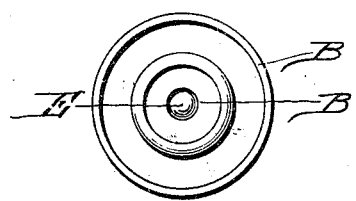
Fig. 6.
Inventor
T. A. Davis,
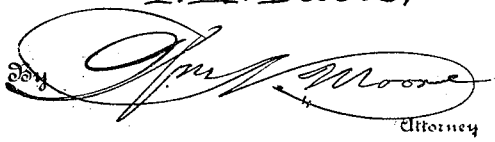
Attorney Patented July 29, 1924.

1,503,230

UNITED STATES PATENT OFFICE.

THOMAS ALBERT DAVIS, OF PARIS, ILLINOIS, ASSIGNOR OF ONE-HALF TO ORION SIMS, OF PARIS, ILLINOIS.

CUFF FASTENER.

Application filed October 24, 1923. Serial No. 670,510.

*To all whom it may concern:*

Be it known that I, THOMAS A. DAVIS, a resident of Paris, in the county of Edgar and State of Illinois, a citizen of the United States, have invented certain new and useful Improvements in Cuff Fasteners, of which the following is a specification.

My invention relates to improvements in cuff fasteners the improvements being particularly directed for use in connection with separable or twin member cuff fasteners or buttons of the Kum-a-part character or type.

The main object of my invention is the provision of means for use in connection with a fastener of this character which will permit the fastener to perform its function in a proper manner, and which will absolutely lock and secure the members against accidental separation while allowing the proper separation of said members when desired.

Another object of my invention is the provision of means for locking the male and female members against accidental separation, which means will not add appreciably to the cost of the fastener while greatly increasing its efficiency and desirability.

Another object of my invention is the provision of a cuff fastener which will possess the advantages stated and which will present a highly ornamental and attractive appearance in order that, all things considered, the invention will prove useful, efficient and practical.

To attain the desired objects, my invention consists of a cuff fastener of the character stated embodying novel features of construction and combination of parts, substantially as described and claimed, and as shown in the accompanying drawing, in which:

Figure 1 represents a perspective view of the complete cuff fastener in locked or secured position.

Fig. 2 represents a similar view showing the parts in open or separated position.

Fig. 3 represents an elevation of the fastener in locked or closed position partly broken away to show the locking means of the fastener.

Fig. 4 represents a similar view, showing the locking head and stem in locked position.

Fig. 5 represents a plan view looking toward the inner face of the female member of the fastener, and Fig. 6 represents a similar view of the male member.

My invention is particularly adapted for use in connection with separable fasteners or buttons of the Kum-a-part type, comprising the male member A, with its spring jaws A', and the female member B, having the engaging portion B' to retain said spring jaws, while my invention consists of the stem or shank C, having the head D at its outer end, and the expanding or enlarged portion E, at its inner end, which, as shown most clearly in Fig. 4, enters between said spring jaws A', and forces them into a locked position, at the same time permitting the withdrawal of said enlarged or expanding portion E from the spring jaws by pulling outward upon the head D.

The male member A is formed with the hollow stem $A^2$ and the rim or flange $A^3$ and the female member B is also formed with the hollow stem $B^2$ and the rim or flange $B^3$, the said rims meeting when the button is locked and the spring jaws A' extending beyond the rim $A^3$.

It will thus be noted that the male and female members are fastened in the usual manner and the expanding member is forced inward between the spring jaws of the male member and effects a locking of said members, but permits upon the withdrawal of said expanding member the separation of said male and female members.

I claim:

1. A cuff fastener, consisting of a male member comprising a head, a hollow stem and a pair of spring jaws arranged in and extending beyond said stem, a female member comprising a head and a hollow stem having a seat to receive said spring jaws and a slidable stem mounted in said female member and having a head to engage and expand said jaws and lock said members in engagement.

2. A cuff fastener, consisting of a male member composed of a head, hollow stem and annular rim, a pair of spring jaws arranged in said stem and extending beyond said rim, a female member, composed of a head, stem and annular rim, said rims being arranged to contact when in locked position and the spring jaws entering the stem of the female member and a sliding stem mounted in the female member and adapted to expand the said spring jaws to lock the members.

In testimony whereof I hereunto affix my signature.

THOMAS ALBERT DAVIS.